United States Patent
Choi et al.

(10) Patent No.: US 8,824,402 B2
(45) Date of Patent: Sep. 2, 2014

(54) APPARATUS AND METHOD FOR TRANSMITTING/RECEIVING DATA IN COMMUNICATION SYSTEM

(75) Inventors: Jee-Yon Choi, Daejeon (KR); Jae-Seung Lee, Daejeon (KR); Jong-Ee Oh, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 322 days.

(21) Appl. No.: 13/446,448

(22) Filed: Apr. 13, 2012

(65) Prior Publication Data

US 2012/0263126 A1    Oct. 18, 2012

(30) Foreign Application Priority Data

Apr. 13, 2011 (KR) .................. 10-2011-0034249
Apr. 12, 2012 (KR) .................. 10-2012-0037759

(51) Int. Cl.
*H04W 4/00* (2009.01)
*H04B 7/06* (2006.01)
*H04B 7/04* (2006.01)
*H04W 48/16* (2009.01)
*H04W 84/12* (2009.01)

(52) U.S. Cl.
CPC ............ *H04B 7/0617* (2013.01); *H04B 7/0643* (2013.01); *H04B 7/0417* (2013.01); *H04W 48/16* (2013.01); *H04W 84/12* (2013.01); *H04B 7/0639* (2013.01)

USPC ........................................................... 370/329

(58) Field of Classification Search
USPC ........................................................... 370/329
See application file for complete search history.

(56) References Cited

U.S. PATENT DOCUMENTS

| 7,920,533 | B2 | 4/2011 | Koo et al. |
| 2007/0298742 | A1 | 12/2007 | Ketchum et al. |
| 2010/0248635 | A1 | 9/2010 | Zhang et al. |

FOREIGN PATENT DOCUMENTS

| JP | 2007-318729 A | 12/2007 |
| JP | 2007-318730 A | 12/2007 |
| KR | 1020090031434 A | 3/2009 |

*Primary Examiner* — Shripal Khajuria (57) ABSTRACT

Disclosed are an apparatus and a method for transmitting/receiving data by acquiring channel information of a terminal receiving data in a communication system providing services to users through beamforming according to a multi-input multi-output (MIMO) scheme, wherein so as to acquire channel information of the terminal for transmitting/receiving data through the beamforming according to the MIMO scheme, a null data packet announcement (NDPA) frame and a null data packet (NDP) frame are transmitted to the terminal, the beamforming frame is received from the terminal as a response of the null data packet announcement frame and the null data packet frame, and the channel information of the terminal included in the beamforming frame and the indication information on which the null data packet frame included in a control information field of the beamforming frame is normally received are checked.

20 Claims, 7 Drawing Sheets

APPARATUS AND METHOD FOR TRANSMITTING/RECEIVING DATA IN COMMUNICATION SYSTEM

CROSS-REFERENCES TO RELATED APPLICATIONS

The present application claims priority of Korean Patent Application Nos. 10-2011-0034249 and 10-2012-0037759, filed on Apr. 13, 2011, and Apr. 12, 2012, respectively, which are incorporated herein by reference in their entirety.

BACKGROUND OF THE INVENTION

1. Field of the Invention

Exemplary embodiments of the present invention relates to a communication system, and more particularly, to an apparatus and a method for transmitting/receiving data by acquiring channel information of a terminal receiving data in a communication system that provides services to users through beamforming according to a multi-input multi-output (hereinafter, referred to as MIMO) scheme.

2. Description of Related Art

In the current communication systems, researches for providing services of various qualities of service (hereinafter, referred to as QoSs) having a high transmission rate to users have been actively conducted. In a wireless local area network (hereinafter, referred to as 'WLAN') that is an example of the communication systems, researches into methods for rapidly and stably transmitting large-capacity data using limited resources have been actively conducted. In particular, in the communication systems, researches into data transmission through wireless channels have been conducted. Recently, methods for allowing the WLAN system to normally transmit/receive large-capacity data by effectively using limited wireless channels have been proposed.

Meanwhile, in order to transmit/receive large-capacity data through wireless channels in the communication systems, a transmitter for transmitting data through the wireless channels needs to acquire channel information of a receiver receiving data through the wireless channels. In this case, data are transmitted and received between the transmitter and the receiver through the wireless channels by using the channel information of the receiver. In particular, in the recent communication systems, for example, the WLAN systems, in order to improve the data transmission efficiency, researches into methods for transmitting/receiving data through the beamforming according to the MIMO scheme have been conducted. As described above, the transmitter for transmitting data through the beamforming according to the MIMO scheme needs to acquire the channel information of the receiver.

However, the current communication systems, for example, the WLAN system, in order to transmit/receive the large-capacity data through the wireless channels, detailed methods for acquiring the channel information of the receiver have not yet been proposed. In particular, when transmitting/receiving data through the beamforming according to the MIMO scheme in the WLAN system, detailed methods for effectively transmitting/receiving the large-capacity data by allowing the transmitter of the WLAN system to acquire the channel information of the receiver have not yet been proposed.

Therefore, in order to rapidly and stably transmit/receiving the large-capacity data through the beamforming according to the MIMO scheme in the communication systems, for example, WLAN system, a need exists for a method for transmitting/receiving data by acquiring the channel information of the receiver.

SUMMARY OF THE INVENTION

An embodiment of the present invention is directed to an apparatus and a method for transmitting/receiving data in a communication system.

Further, an embodiment of the present invention is directed to an apparatus and a method for rapidly and stably transmitting/receiving large-capacity data through beamforming in a communication system providing service according to a MIMO scheme.

In addition, an embodiment of the present invention is directed to an apparatus and a method for rapidly and stably transmitting/receiving large-capacity data through beamforming according to a MIMO scheme by acquiring channel information of a receiver in a communication system providing service according to a MIMO scheme.

An apparatus for transmitting data in a communication system, includes: a transmitting unit configured to transmit a null data packet announcement (NDPA) frame and a null data packet (NDP) frame to a terminal so as to acquire channel information of the terminal for transmitting and receiving data through beamforming according to multi-input multi-output (MIMO); a receiving unit configured to receive a beamforming frame from the terminal as a response of the null data packet announcement frame and the null data packet frame; and a checking unit configured to check indication information on whether the null data packet frame included in the a control information field of the beamforming frame is normally received, wherein the transmitting unit retransmits the data packet announcement frame and the null data packet frame to the terminal or transmit a beamforming-poll frame to the terminal according to the indication information on whether the null data packet frame is normally received.

An apparatus for receiving data in a communication system, includes; a receiving unit configured to receive a null data packet announcement (NDPA) frame and a null data packet (NDP) frame from a transmitter so as to provide channel information of the terminal for transmitting and receiving data through beamforming according to multi-input multi-output (MIMO); a transmitting unit configured to transmit a beamforming frame to the terminal as a response of the null data packet announcement frame and the null data packet frame; and a checking unit configured to extract channel information of the terminal by using the null data packet frame, wherein the transmitting unit transmits a beamforming frame including indication information on whether the null data packet frame is normally received or transmits beamforming frame including the channel information of the terminal to the transmitter.

A method for transmitting/receiving data in a communication system, includes: transmitting a null data packet announcement (NDPA) frame and a null data packet (NDP) frame to a terminal so as to acquire channel information of the terminal for transmitting and receiving data through beamforming according to multi-input multi-output (MIMO); receiving a beamforming frame from the transmitter as a response of the null data packet announcement frame and the null data packet frame; and checking channel information of the terminal included in the beamforming frame and indication information on whether the null data packet frame included in the a control information field of the beamforming frame is normally received.

DESCRIPTION OF SPECIFIC EMBODIMENTS

Exemplary embodiments of the present invention will be described below in more detail with reference to the accompanying drawings. Only portions needed to understand an operation in accordance with exemplary embodiments of the present invention will be described in the following description. It is to be noted that descriptions of other portions will be omitted so as not to make the subject matters of the present invention obscure.

Exemplary embodiments of the present invention propose an apparatus and a method for transmitting/receiving data in a communication system, for example, a wireless local area network (hereinafter, referred to as 'WLAN') system. Herein, although the embodiments of the present invention describe the WLAN system by way of example, a method for transmitting and receiving data that is proposed in the embodiment of the present invention may also be applied to other communication systems.

Further, in the embodiments of the present invention, an apparatus and a method for normally transmitting/receiving data by acquiring channel information of a terminal, for example, a station (hereinafter, referred to as 'STA') in a communication system that provides services according to a multi-input multi-output (hereinafter, referred to as 'MIMO') scheme. Herein, the embodiments of the present invention describe a communication system, for example, an IEEE 802.11 WLAN system by way of example, wherein when the WLAN system provides services to users according to the MIMO scheme, the WLAN system acquires the channel information of STAB and then, rapidly and normally transmits/receives large-capacity data based on the channel information.

In this case, in the embodiments of the present invention, as described above, transmission/reception performance of data is improved by the MIMO scheme to rapidly and normally transmit/receive the large-capacity data. Herein, in the embodiments of the present invention, the transmission/reception performance of data through beamforming according to the MIMO scheme is improved. A transmitter, for example, an access point (AP) or a terminal (for example, STA) that transmits data through the beamforming according to the MIMO scheme acquires channel information of a receiver, for example, an AP or a terminal (for example, STA) that receives data through the beamforming according to the MIMO scheme from the transmitter and then, transmits data to the receiver through the beamforming by using the channel information of the acquired receiver. Hereinafter, in the embodiments of the present invention, for convenience of explanation, the AP or the terminal, that is, the transmitter that transmits data through the beamforming according to the MIMO scheme is referred to as a beamformer and the AP or the terminal, that is, the receiver that receives data from the transmitter, that is, the beamformer through the beamforming according to the MIMO scheme is referred to as a beamformee.

That is, in the embodiments of the present invention, in order to transmit and receive data through the beamforming according to the MIMO scheme, the beamformer acquires the channel information of the beamformee and the beamformer and the beamformee rapidly and normally transmits/receives data by using the acquired channel information. In this case, the beamformer acquires the channel information of the beamformee by using a sounding protocol for acquiring the channel information of the beamformee and transmits and receives data to and from the beamformee through the beamforming according to the MIMO scheme by using the acquired channel information. Here, the data transmission/reception between the beamformer and the beamformee through the beamforming according to the MIMO scheme in the communication system in accordance with the embodiments of the present invention will be described in detail with reference to FIG. 1.

Figure 1:
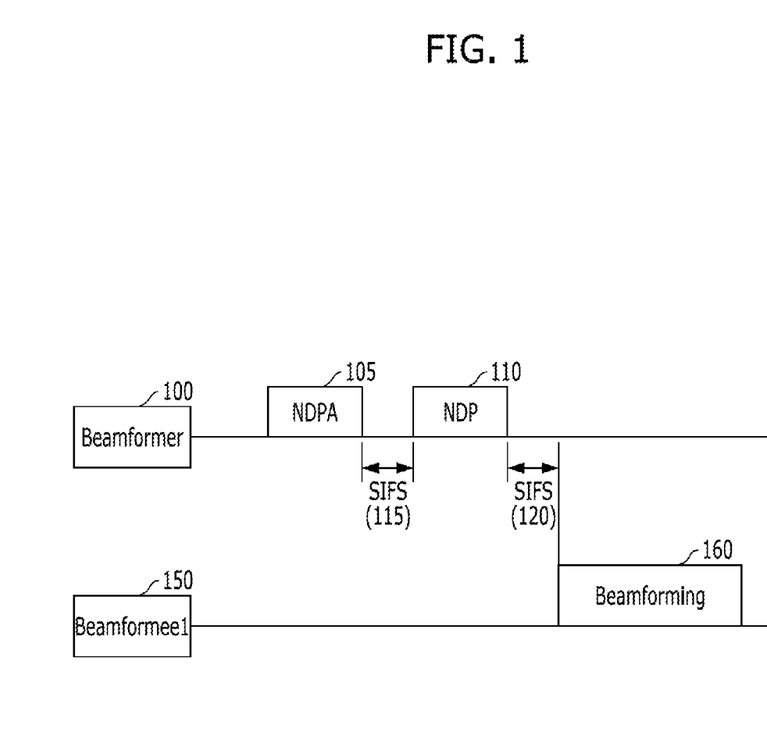
FIGS. 1 to 7 are diagrams schematically illustrating a data transmitting/receiving procedure in a communication system in accordance with an embodiment of the present invention.

FIG. 1 is a diagram schematically illustrating a data transmitting/receiving procedure in a communication system in accordance with an embodiment of the present invention. Here, FIG. 1 is a diagram schematically illustrating a data transmitting/receiving procedure for acquiring channel information of the beamformee by using the sounding protocol so as to transmit/receive data between the beamformer and the beamformee through the beamforming according to the MIMO scheme in the communication system in accordance with the embodiment of the present invention.

Referring to FIG. 1, the beamformer 100 transmits a null data packet announcement (hereinafter, referred to as 'NDPA') frame 105 and a null data packet (hereinafter, referred to as 'NDP') frame 110 to the beamformee 150 so as to acquire the channel information of the beamformee 150 by using the sounding protocol. Here, the beamformer 100 acquires the channel information of the beamformee 150 in order to transmit/receive the data to and from the beamformee 150 through the beamforming according to the MIMO scheme. In this case, as described above, the beamformer 100 acquires the channel information of the beamformee 150 by using the sounding protocol.

That is, the beamformer 100 transmits the NDPA frame 105 including the terminal information, that is, the beamformee information of the terminals receiving the NDP frame 110 in which data of a medium access control (hereinafter, referred to as 'MAC') layer are not present to the terminal, that is, the beamformee 150 and then, transmits the NDP frame 110 to the beamformee 150, so as to acquire the channel information of the beamformee 150 by using the sounding protocol. Here, the NDP frame 110 is transmitted to the beamformee 150 receiving the NDPA frame 105 after a short interframe space (SIFS) section 115, after the NDPA frame 105 is transmitted to the beamformee 150.

Further, the beamformee 150 receiving the NDPA frame 105 and the NDP frame 110 transmits a beamforming frame 160 including the channel information of the beamformee 150 to the beamformer 100. Here, the beamformee 150 extracts its own channel information by using the NDP frame 110 and transmits the extracted channel information to the beamformer 100 through the beamforming frame 160. Further, the beamforming frame 160 is transmitted to the beamformer 100 after an SIFS section 120, after the NDP frame 110 is transmitted to the beamformee 150, that is, the beamformee 150 receives the NDP frame 110.

In addition, the beamformer 100 receiving the beamforming frame 160 from the beamformee 150 acquires the channel information of the beamformee 150 from the beamforming frame 160 and then, in order to transmit and receive data to and from the beamformee 150 through the beamforming according to the MIMO scheme, generates a steering matrix necessary for the beamforming by using the channel information and then, transmits and receives data to and from the beamformee 150 through the beamforming according to the MIMO scheme. Here, the data transmission/reception between the beamformer and the plurality of beamformees through the beamforming according to the MIMO scheme in the communication system in accordance with another embodiment of the present invention will be described in detail with reference to FIG. 2.

Figure 2:
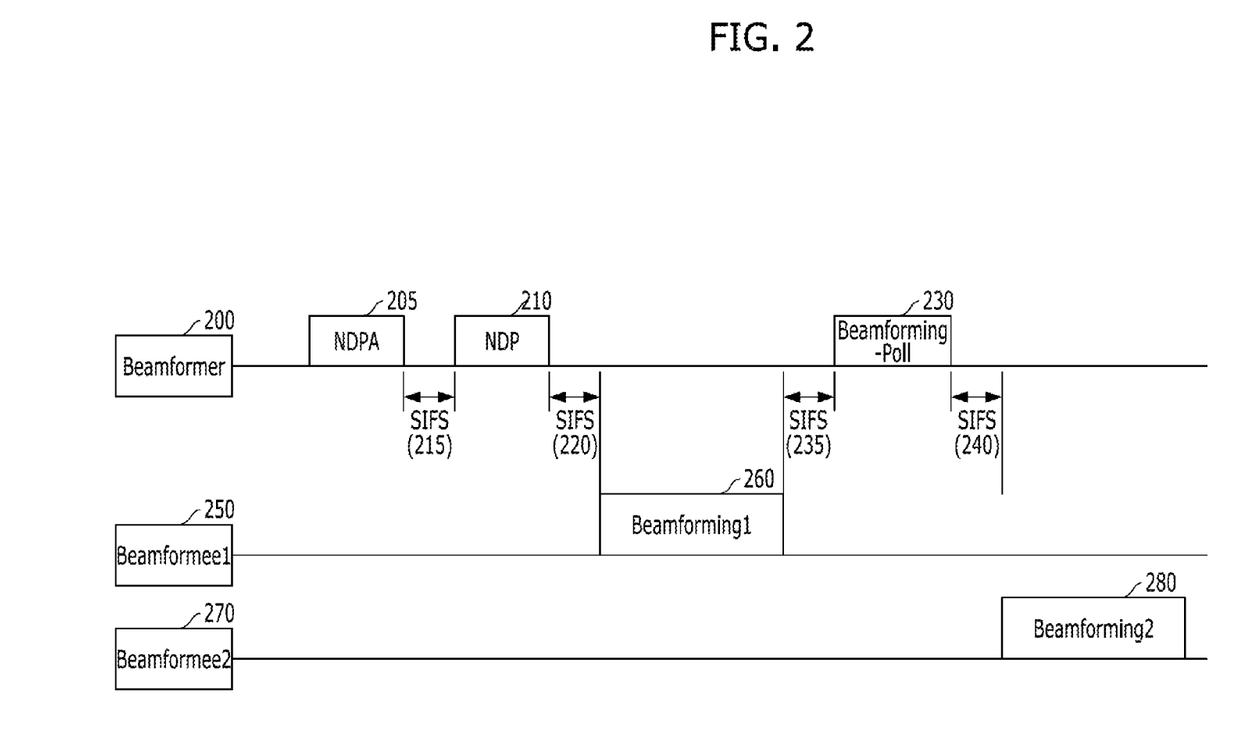

FIG. 2 is a diagram schematically illustrating a data transmitting/receiving procedure in a communication system in accordance with another embodiment of the present invention. Here, FIG. 2 is a diagram schematically illustrating a data transmitting/receiving procedure for acquiring channel information of the beamformees by using the sounding protocol so as to transmit/receive data between the beamformer and the plurality of beamformees through the beamforming according to the MIMO scheme in the communication system in accordance with the embodiment of the present invention.

Referring to FIG. 2, the beamformer 200 transmits the NDPA frame 205 and the NDP frame 210 to the beamformees 250 and 270, respectively, so as to acquire the channel information of the plurality of beamformees, for example, beamformee 1 250 and beamformee 2 270 by using the sounding protocol. Here, the beamformer 200 acquires the channel information of the beamformees 250 and 270 in order to transmit/receive the data to and from the beamformees 250 and 270 through the beamforming according to the MIMO scheme. In this case, as described above, the beamformer 100 acquires the channel information of the beamformees 250 and 270 by using the sounding protocol.

That is, the beamformer 200 transmits the NDPA Frame 205 including terminal information, that is, beamformee information of the terminals receiving the NDP frame 210 in which the data of the MAC layer are not present to the terminals, that is, the beamformees 250 and 270 and then, transmits the NDP frame 210 to the beamformees 250 and 270, so as to acquire the channel information of the beamformees 250 and 270 by using the sounding protocol.

As described above, the NDPA frame 205 includes the information of the beamformees 250 and 270 receiving the NDP frame 210 and also includes the information about the first responding beamformee among the beamformees 250 and 270 receiving the NDP frame 210. For example, the NDPA frame 205 includes information informing that the beamformee 1 250 transmits the beamforming frame as a response of the NDP frame 210 earlier than the beamformee 2 270, among the beamformees 250 and 270 receiving the NDP frame 210. The NDP frame 210 is transmitted to the beamformees 250 and 270 receiving the NDPA frame 205 after an SIFS section 215, after the NDPA frame 205 is transmitted to the beamformees 250 and 270.

Further, the beamformee 250,270 receiving the NDPA frame 205 and the NDP frame 210 transmit beamforming frames 260 and 280 including the channel information of the beamformees 250 and 270 to the beamformer 200. In this case, the beamformees 250 and 270 check the beamformee first transmitting the beamforming frame as the response of the NDP frame 210 through the NDPA frame 205. Here, the beamformees 250 and 270 extract their own channel information by using the NDP frame 210 and transmits the extracted channel information to the beamformer 200 through the beamforming frame 260 and 280.

That is, in the beamformees 250 and 270 receiving the NDPA frame 205 and the NDP frame 210, the beamformee 1 250 having response priority to the NDP frame 210 checks that it first transmits the beamforming frame 260 as the response of the NDP frame 210 through the NDPA frame 205. Therefore, the beamformee 1 250 transmits the beamforming frame 1 260 including the channel information of the beamformee 1 250 to the beamformer 200 after an SIFS section 220, after the NDP frame 210 is transmitted to the beamformees 250 and 270, that is, the beamformee 1 250 receives the NDP frame 210.

Further, the beamformer 200 receiving the beamforming frame 1 260 from the beamformee 1 250 transmits a beamforming-poll frame 230 to the beamformee 2 270 so as to implement the sounding of the remaining beamformees, for example, the beamformee 2 270, that is, acquire the channel information of the beamformee 2 270. Here, the beamforming-poll frame 230 is transmitted to the beamformee 2 270 receiving the NDPA frame 205 after an SIFS section 235, after receiving the beamforming frame 1 260 from the beamformee 1 250. In addition, as described above, the beamforming-poll frame 230 is transmitted for the sounding of the beamformees that do not transmit the beamforming frame or is transmitted for retransmission of the beamforming frame for the beamformees, when using the sounding protocol for acquiring the channel information of the plurality of beamformees. Here, when the beamformee transmitting the current beamforming frame is set as a receiving address, the beamforming-poll frame 230 is transmitted to the corresponding beamformee.

Further, the beamformee 2 270 receiving the beamforming-poll frame 230 transmits the beamforming frame 2 280 including the channel information of the beamformee 2 270 to the beamformer 200 after an SIFS section 240, after the beamforming-poll frame 230 is transmitted to the beamformee 2 270, that is, the beamformee 2 270 receives the beamforming-poll frame 230. That is, the beamformee 2 270 receives the beamforming-poll frame 230 using the beamformee 2 270 as a receiving address and then, transmits its own channel information extracted by using the NDP frame 210 to the beamformer 200 through the beamforming frame 2 280 after the SIFS section 240.

Further, the beamformer 200 receiving the beamforming frames 260 and 280 from the beamformees 250 and 270 acquires the channel information of the beamformees 250 and 270 from the beamforming frames 260 and 280 and then, in order to transmit and receive data to and from the beamformees 250 and 270 through the beamforming according to the MIMO scheme, generates the steering matrix necessary for the beamforming by using the channel information, and then, transmits and receives data to and from the beamformees 250 and 270 through the beamforming according to the MIMO scheme. Here, the beamformer 200 generates the steering matrix for beamforming for each of the beamformees 250 and 270 according to the MIMO scheme or generates the steering matrix for simultaneously beamforming for the beamformees 250 and 270 according to a multi user MIMO scheme. Here, when transmitting and receiving data through the beamforming according to the MIMO scheme in the communication system in accordance with the embodiments of the present invention, the frame for acquiring the channel information of the beamformee will be described in detail with reference to FIG. 3.

Figure 3:
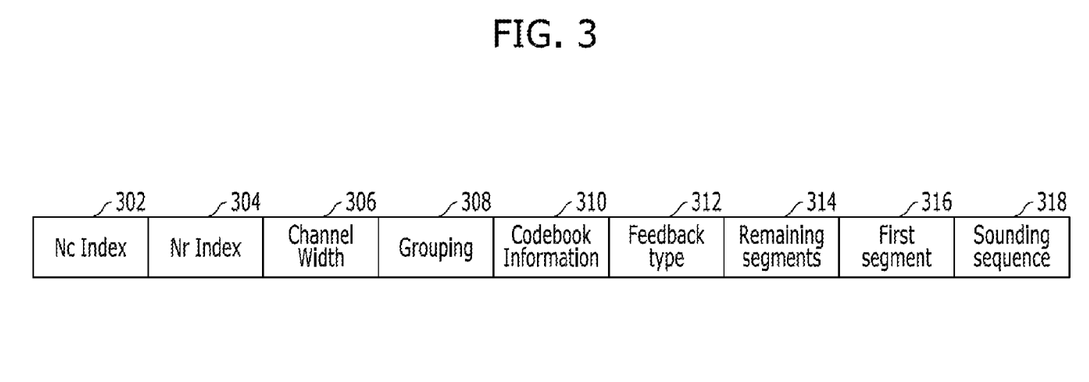

FIG. 3 is a diagram schematically illustrating a structure of a beamforming frame in a communication system in accordance with the embodiment of the present invention. Here, FIG. 3 is a diagram schematically illustrating a structure of a beamforming frame including the channel information of the beamformee so as to transmit and receive data through the beamforming in accordance with the MIMO scheme as described above. In particular, FIG. 3 is a diagram schematically illustrating a structure of a control information field of the beamforming frame. Here, the beamforming frame includes a beamforming report field including the channel information and a control information field including the necessary control information so as to check the channel information indicated by the beamforming report field.

Referring to FIG. 3, the control information field of the beamforming frame includes: an Nc index field 302 indicating the number of columns of a channel matrix according to the MIMO scheme; an Nr index field 304 indicating the number of rows of the channel matrix; a channel width field 306 indicating a width of a channel according to the MIMO scheme; a grouping field 308 indicating the number of carriers grouping in the channel according to the MIMO scheme; a codebook information field 310 indicating a size of a codebook for the channel according to the MIMO scheme; a feedback type field 312 indicating a feedback type for the beamforming according to the MIMO scheme; a remaining segment field 314 indicating the number of remaining segments in the beamforming frame; a first segment field 316 of a segmented frame in the beamforming frame; and a sounding sequence field 318 indicating a sequence number from the NDPA frame requesting a feedback.

As described above, in the communication system in accordance with the embodiment of the present invention, the beamformer transmits the NDPA frame and the NDP frame to the beamformees, receives the beamforming frame from the beamformees receiving the NDPA frame and the NDP frame. In this case, the steering matrix is generated by using the channel information of the beamformees included in the beamforming report field of the beamforming frame through the control information included in the control information field of the beamforming frame. In addition, the beamformees extracts their own channel information through the NDP frame and transmits the beamforming frame including the extracted channel information according to the NDPA frame to the beamformer, after receiving the NDPA frame and the NDP frame. Here, the case in which the beamforming frame including the channel information of the beamformees is not normally transmitted and received between the beamformer and the beamformees in the communication system in accordance with the embodiment of the present invention will be described in detail with reference to FIGS. 4 to 7.

Figure 4:
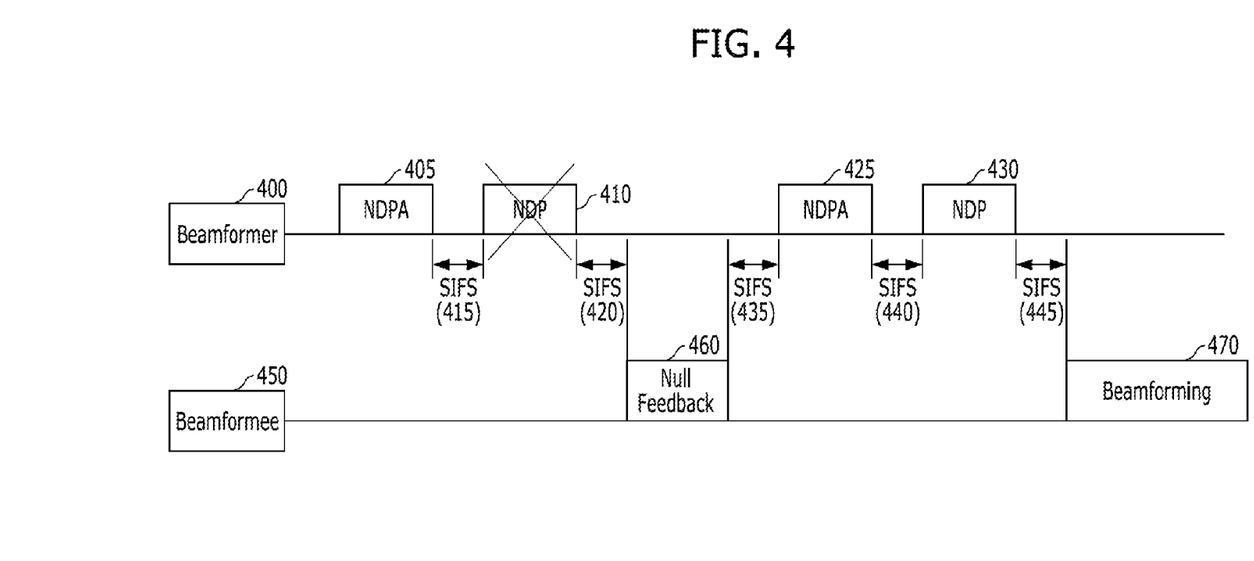

FIG. 4 is a diagram schematically illustrating a data transmitting/receiving procedure in a communication system in accordance with another embodiment of the present invention. Here, FIG. 4 is a diagram schematically illustrating a data transmitting/receiving procedure for acquiring channel information of the beamformee by using the sounding protocol so as to transmit/receive data between the beamformer and the beamformee through the beamforming according to the MIMO scheme in the communication system in accordance with the embodiment of the present invention. In particular, FIG. 4 is a diagram schematically illustrating the data transmitting/receiving procedure when the beamformee does not receive the NDP frame from the beamformer.

Referring to FIG. 4, a beamformer 400 transmits an NDPA 405 and an NDP frame 410 to a beamformee 450 so as to acquire the channel information of the beamformee 450 by using the sounding protocol. Here, the beamformer 400 acquires the channel information of the beamformee 450 in order to transmit/receive the data to and from the beamformee 450 through the beamforming according to the MIMO scheme. In this case, as described above, the beamformer 100 acquires the channel information of the beamformee 450 by using the sounding protocol.

That is, the beamformer 400 transmits the NDPA Frame 205 including terminal information, that is, beamformee information of the terminals receiving the NDP frame 410 in which the data of the MAC layer are not present to the terminals, that is, the beamformee 450 and then, transmits the NDP frame 410 to the beamformee 450, so as to acquire the channel information of the beamformee 450 by using the sounding protocol. Here, the NDP frame 410 is transmitted to the beamformee 450 receiving the NDPA frame 205 after an SIFS section 415, after the NDPA frame 405 is transmitted to the beamformee 450.

As such, when the beamformee 450 does not receive the NDP frame 410 in the NDPA frame 405 and the NDP frame 410 transmitted by the beamformer 400, the beamformee 450 transmits a null feedback frame 460 to the beamformer 400 according to the NDPA frame 405. Here, the beamformee 450 does not extract its own channel information by using the NDP frame 410 since it does not receive the NDP frame 410 and thus, transmits the null feedback frame 460 to the beamformer 400.

Further, as described above, since the beamformee 450 does not extract the channel information, the null feedback frame 460 does not include the beamforming report field of the beamforming frame and sets all the bits of the remaining segment fields to '1' in the control information field of the beamforming frame and becomes the beamforming frame in which the bit of the first segment field is set to be '0'. That is, the null feedback frame 460 does not include the channel information of the beamformee 450 and is transmitted to the beamformer 400 as the frame including only the control information field of the beamforming frame. In addition, the null feedback frame 460 is transmitted to the beamformer 400 after an SIFS section 420, after the NDP frame 410 is transmitted to the beamformer 450.

As such, the beamformer 400 receiving the null feedback frame 460 from the beamformee 450 performs the resounding for acquiring the channel information of the beamformee 450, that is, again transmits the NDPA 425 and the NDP frame 430 to the beamformee 450. Here, as the beamformee 450 does not receive the first transmitted NDP frame 410 and thus, does not acquire the channel information of the beamformee 450, the beamformer 400 transmits the NDPA frame 425 and the NDP frame 430 to the beamformee 450 transmitting the null feedback frame 460 for resounding.

Here, the NDPA frame 425 is retransmitted to the beamformee 450 after an SIFS section 435 after receiving the null feedback frame 460 from the beamformee 450 and the NDP frame 430 is transmitted to the beamformee 450 receiving the NDPA frame 425 after an SIFS section 440, after the NDPA frame 425 is transmitted to the beamformee 450.

Further, the beamformee 450 receiving the NDPA frame 425 and the NDP frame 430 transmits a beamforming frame 470 including of the channel information of the beamformee 450 to the beamformer 400. Here, the beamformee 450 extracts its own channel information by using the NDP frame 430 and transmits the extracted channel information to the beamformer 400 through the beamforming frame 470. Further, the beamforming frame 470 is transmitted to the beamformer 400 after an SIFS section 445, after the NDP frame 430 is transmitted to the beamformee 450, that is, the beamformee 450 receives the NDP frame 430.

Further, the beamformer 400 receiving the beamforming frames 470 from the beamformee 450 acquires the channel information of the beamformee 450 from the beamforming frame 470 and then, in order to transmit and receive data to and from the beamformee 450 through the beamforming according to the MIMO scheme, generates the steering matrix necessary for the beamforming by using the channel information, and then, transmits and receives data to and from the beamformee 450 through the beamforming according to the MIMO scheme. The case in which the beamforming frame including the channel information of the beamformees is normally transmitted and received between the beamformer and the beamformees in a communication system in accordance with another embodiment of the present invention will be described in detail with reference to FIG. 5.

Figure 5:
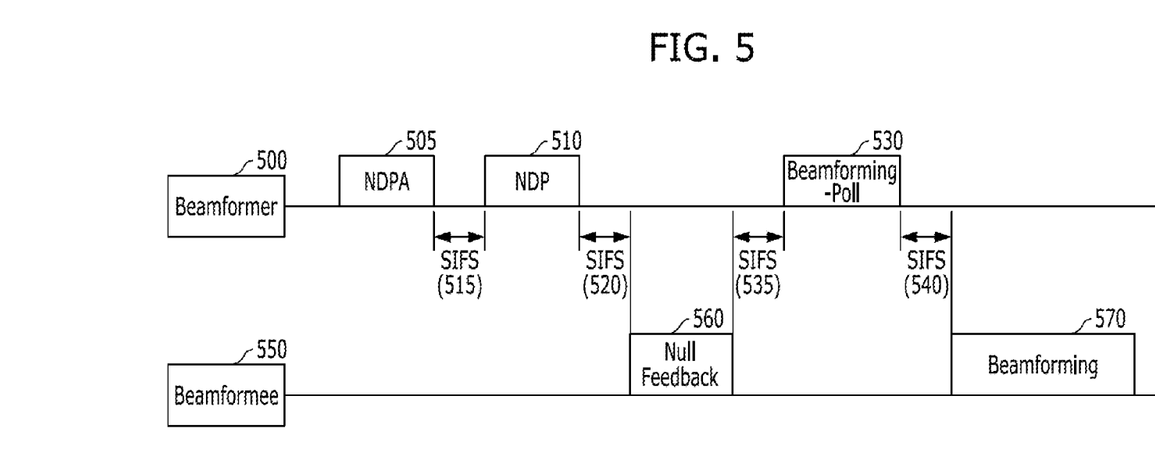

FIG. 5 is a diagram schematically illustrating a data transmitting and receiving procedure in a communication system in accordance with another embodiment of the present invention. Here, FIG. 5 is a diagram schematically illustrating a data transmitting/receiving procedure for acquiring channel information of the beamformee by using the sounding protocol so as to transmit/receive data between the beamformer and the beamformee through the beamforming according to the MIMO scheme in the communication system in accordance with the embodiment of the present invention. In particular, FIG. 5 is a diagram schematically illustrating the data transmitting/receiving procedure when the beamformee does not configure the beamforming frame during the SIFS section.

Referring to FIG. 5, a beamformer 500 transmits an NDPA 505 and an NDP frame 510 to a beamformee 550 so as to acquire the channel information of the beamformee 550 by using the sounding protocol. Here, the beamformer 500 acquires the channel information of the beamformee 550 in order to transmit/receive the data to and from the beamformee 550 through the beamforming according to the MIMO scheme. In this case, as described above, the beamformer 500 acquires the channel information of the beamformee 550 by using the sounding protocol.

That is, the beamformer 500 transmits the NDPA Frame 505 including terminal information, that is, beamformee information of the terminals receiving the NDP frame 510 in which the data of the MAC layer are not present to the terminals, that is, the beamformee 550 and then, transmits the NDP frame 510 to the beamformee 550, so as to acquire the channel information of the beamformee 550 by using the sounding protocol. Here, the NDP frame 510 is transmitted to the beamformee 550 receiving the NDPA frame 505 after an SIFS section 515, after the NDPA frame 505 is transmitted to the beamformee 550.

As such, when the beamformee 550 receiving the NDPA frame 505 and the NDP frame 510 transmitted by the beamformer 500 does not configure the beamforming frame including the channel information of the beamformee 550 within a predetermined time section, for example, an SIFS section 520, the beamformee 550 transmits the null feedback frame 560 to the beamformer 500 according to the NDPA frame 505.

Here, the beamformee 550 needs to configure the beamforming frame including the channel information by extracting the channel information included in the beamforming report field of the beamforming frame within the SIFS section 520. However, the channel information included in the beamforming report field of the beamforming frame increase the amount of data as a width of a channel for the beamformee 550, that is, a bandwidth of a channel is large or the number of antennas used to transmit/receive data is increased. Therefore, the beamformee 550 does not generate the beamforming frame including the large-capacity channel information extraction and the large-capacity channel information within the SIFS section 520, as described above. Therefore, the beamformee 550 transmits the null feedback frame 560 to the beamformer 500.

Further, as described above, as the beamformee 550 receives the NDP frame 510 but does not configure the beamforming frame including its own channel information within the SIFS section 520, the null feedback frame 560 does not include the beamforming report field of the beamforming frame and becomes the beamforming frame including only the control information field of the beamforming frame. That is, the null feedback frame 560 does not include the channel information of the beamformee 550 and is not transmitted to the beamformer 500 as the frame including only the control information field of the beamforming frame. The control information field included in the null feedback frame 560 includes the information on whether the NDP frame 510 is normally received in the beamformee 550. Here, the beamforming frame including the control information field including the information on whether the NDP frame 510 is normally received, that is, the null feedback frame 560 will be described in detail with reference to FIG. 6. In addition, the null feedback frame 560 is transmitted to the beamformer 500 after the SIFS section 520, after the NDP frame 510 is transmitted to the beamformee 550.

The beamformer 500 receiving the null feedback frame 560 from the beamformee 550 transmits the beamforming-poll frame 530 to the beamformee 550 so that the beamformee 550 transmits the beamforming frame including the channel information of the beamformee 550, thereby acquiring the channel information of the beamformee 550. In this case, the beamformer 500 transmits the beamforming-poll frame 530 to the beamformee 550 transmitting the null feedback frame 560 so that the beamformee 550 configures and transmits the beamforming frame including its own channel information, as the beamformee 550 normally receives an NDP frame 710 but does not configure the beamforming frame including its own channel information within the SIFS section 520 and thus, does not acquire the channel information of the beamformee 500.

In this case, the beamforming-poll frame 530 is transmitted to the beamformee 550 after the SIFS section 535, after receiving the null feedback frame 560 from the beamformee 550. In addition, as described above, the beamforming-poll frame 530 is transmitted for the sounding of the beamformees that do not transmit the beamforming frame or is transmitted for retransmission of the beamforming frame for the beamformees, when using the sounding protocol for acquiring the channel information of the plurality of beamformees. Here, when the beamformee transmitting the current beamforming frame is set as a receiving address, the beamforming-poll frame 530 is transmitted to the corresponding beamformee.

Further, the beamformee 550 receiving the beamforming-poll frame 530 transmits the beamforming frame 570 to the beamformer 500 after configuring the beamforming frame 570 including the channel information of the beamformee 550. Here, the beamformee 550 extracts its own channel information using the NDP frame 510 and configures the beamforming frame 570 including the extracted channel information and transmits the configured beamforming frame 570 to the beamformer 500, as it acquires a sufficient time required to configure the beamforming frame 570 including its own channel information from the reception of the NDP frame 510 to the reception of the beamforming-poll frame 530. Further, the beamforming frame 570 is transmitted to the beamformer 500 after an SIFS section 540, after the beamforming-poll frame 530 is transmitted to the beamformee 550, that is, the beamformee 550 receives the beamforming-poll frame 530.

Further, the beamformer 500 receiving the beamforming frames 570 from the beamformee 550 acquires the channel information of the beamformee 550 from the beamforming frame 570 and then, in order to transmit and receive data to and from the beamformee 550 through the beamforming according to the MIMO scheme, generates the steering matrix necessary for the beamforming by using the channel information, and then, transmits and receives data to and from the beamformee 550 through the beamforming according to the MIMO scheme. Here, when transmitting and receiving data through the beamforming according to the MIMO scheme in a communication system in accordance with another embodiment of the present invention, the frame for acquiring the channel information of the beamformee will be described in detail with reference to FIG. 6.

Figure 6:
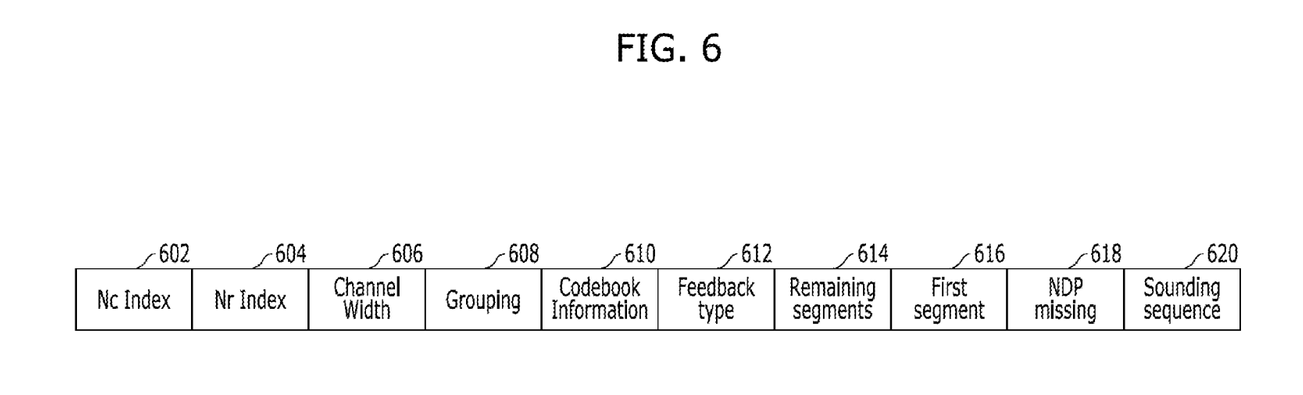

FIG. 6 is a diagram schematically illustrating a structure of the beamforming frame in the communication system in accordance with the embodiment of the present invention. FIG. 6 is a diagram schematically illustrating a structure of a beamforming frame including the channel information of the beamformee so as to transmit and receive data through the beamforming according to the MIMO scheme as described above. In particular, FIG. 6 is a diagram schematically illustrating a structure of a control information field of the beamforming frame. Here, as described above, the beamforming frame includes the beamforming report field including the channel information and the control information field including the control information required to check the channel information indicated by the beamforming report field.

Referring to FIG. 6, the control information field of the beamforming frame includes: an Nc index field 602 indicating the number of columns of a channel matrix according to the MIMO scheme; an Nr index field 604 indicating the number of rows of the channel matrix; a channel width field 606 indicating a width of a channel according to the MIMO scheme; a grouping field 608 indicating the number of carriers grouping in the channel according to the MIMO scheme; a codebook information field 610 indicating a size of a codebook for the channel according to the MIMO scheme; a feedback type field 612 indicating a feedback type for the beamforming according to the MIMO scheme; a remaining segment field 614 indicating the number of remaining segments in the beamforming frame; a first segment field 616 of a segmented frame in the beamforming frame; an NDP missing field 618 indicating whether the NDP frame is normally received in the beamformee; and a sounding sequence field 618 indicating a sequence number from the NDPA frame requesting a feedback.

As described above, in the communication system in accordance with the embodiment of the present invention, the beamformer transmits the NDPA frame and the NDP frame to the beamformees, receives the beamforming frame from the beamformees receiving the NDPA frame and the NDP frame. In this case, the steering matrix is generated by using the channel information of the beamformees included in the beamforming report field of the beamforming frame through the control information included in the control information field of the beamforming frame. In addition, the beamformees extracts their own channel information through the NDP frame and transmits the beamforming frame including the extracted channel information according to the NDPA frame to the beamformer, after receiving the NDPA frame and the NDP frame.

Further, when the beamformees do not normally receive the NDP frame, they include the information that they do not normally receive the NDP frame in the NDP missing field 618 in the control information field of the beamforming frame and transmit the beamforming frame, that is, the null feedback frame including only the control information field in which the information that they do not receive NDP frame is included in the NDP missing field 618, to the beamformer. That is, the null feedback frame becomes the beamforming frame of the control information field in which the channel information of the beamformees is not included and the information that the beamformees do not receive NDP frame is included in the NDP missing field 618.

The beamformer receiving the beamforming frame, that is, the null feedback frame of the control information field including the NDP frame non-receive information transmits the NDPA frame and the NDP frame to the beamformees transmitting the null feedback frame for resounding as illustrated in FIG. 4. That is, when the beamformee does not normally receive the NDP frame from the beamformer, the beamformer transmits the null feedback frame including the information indicating that the NDP frame is not normally received in the NDP missing field 618 in the control information field of the beamforming frame to the beamformer as described above and transmits the beamforming frame including the channel information to the beamformer after performing the resounding of the beamformer. Here, the case in which the beamformee does not normally receive the NDP frame from the beamformer will be described in detail with reference to FIG. 4. Herein, the detailed description thereof will be omitted.

Further, when the beamformees do normally receive the NDP frame and then, do not configure the beamforming frame including its own channel information within the SIFS section, they include the information indicating that they do not normally receive the NDP frame in the NDP missing field 618 in the control information field of the beamforming frame and transmit the beamforming frame, that is, the null feedback frame including only the control information field in which the information that the NDP frame is normally received is included in the NDP missing field 618, to the beamformer. That is, the null feedback frame becomes the beamforming frame of the control information field in which the channel information of the beamformees is not included and the information that the beamformees normally receive the NDP frame is included in the NDP missing field 618.

As such, the beamformer receiving the beamforming frame, that is, the null feedback frame of the control information field including the information that it normally receives the NDP frame transmits the beamforming-poll frame to the beamformees transmitting the null feedback frame so as to receive the beamforming frame including the channel information of the beamformee as illustrated in FIG. 5. That is, when the beamformee normally receives the NDP frame from the beamformer and does not configure the beamforming frame including its own channel information within the SIFS section, the beamformee transmits the null feedback frame including the information indicating that the NDP frame is normally received in the NDP missing field 618 in the control information field of the beamforming frame to the beamformer as described above and configures the beamforming frame including the channel information and then, transmits the beamforming frame including the channel information to the beamformer. Herein, the case in which the beamformee normally receives the NDP frame and then, does not configure the beamforming frame including its own channel information within the SIFS section will be described in detail with reference to FIG. 5 and therefore, the detailed description thereof will be omitted. Here, the data transmission/reception between the beamformer and the plurality of beamformees through the beamforming according to the MIMO scheme in the communication system in accordance with another embodiment of the present invention will be described in detail with reference to FIG. 7

Figure 7:
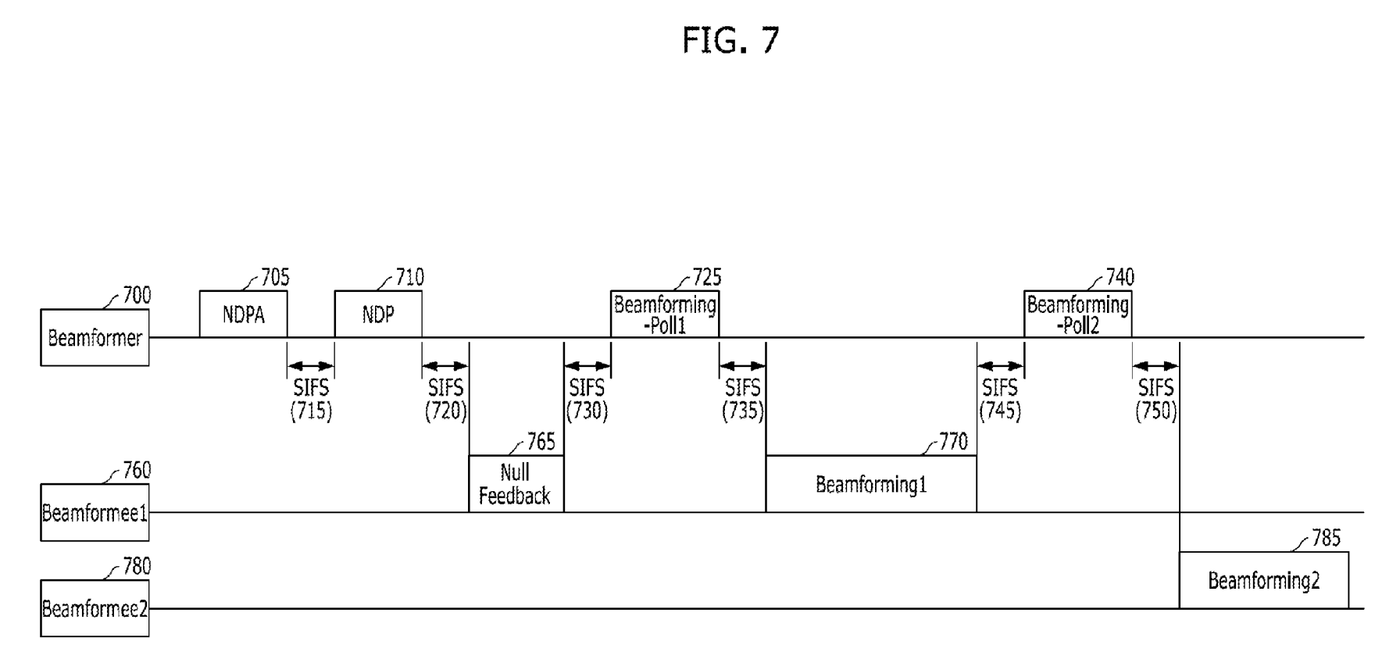

FIG. 7 is a diagram schematically illustrating a data transmitting/receiving procedure in a communication system in accordance with another embodiment of the present invention. Here, FIG. 7 is a diagram schematically illustrating a data transmitting/receiving procedure for acquiring channel information of the plurality of beamformees by using the sounding protocol so as to transmit/receive data between the beamformer and the plurality of beamformees through the beamforming according to the MIMO scheme in the communication system in accordance with the embodiment of the present invention. In particular, FIG. 7 is a diagram schematically illustrating the data transmitting/receiving procedure when the beamformees do not configure the beamforming frame during the SIFS section.

Referring to FIG. 7, a beamformer 700 transmits an NDPA frame 705 and an NDP frame 710 to beamformees 760 and 780, respectively, so as to acquire the channel information of the plurality of beamformees, for example, beamformee 1 760 and beamformee 2 780 by using the sounding protocol. Here, the beamformer 700 acquires the channel information of the beamformees 760 and 780 in order to transmit/receive the data to and from the beamformees 760 and 780 through the beamforming according to the MIMO scheme. In this case, as described above, the beamformer 100 acquires the channel information of the beamformees 760 and 780 by using the sounding protocol.

That is, the beamformer 700 transmits the NDPA Frame 705 including terminal information, that is, beamformee information of the terminals receiving the NDP frame 710 in which the data of the MAC layer are not present to the terminals, that is, the beamformees 760 and 780 and then, transmits the NDP frame 710 to the beamformees 760 and 780, so as to acquire the channel information of the beamformees 760 and 780 by using the sounding protocol.

As described above, the NDPA frame 705 includes the information of the beamformees 760 and 780 receiving the NDP frame 710 and also includes the information about the first responding beamformee among the beamformees 760 and 780 receiving the NDP frame 710. For example, the NDPA frame 705 includes information informing that the beamformee 1 760 transmits the beamforming frame as a response of the NDP frame 710 earlier than the beamformee 2 780, among the beamformees 760 and 780 receiving the NDP frame 710. The NDP frame 710 is transmitted to the beamformees 760 and 780 receiving the NDPA frame 705 after an SIFS section 715, after the NDPA frame 705 is transmitted to the beamformees 760 and 780.

As such, when any beamformee among the beamformees 760 and 780 receiving the NDPA frame 705 and the NDP frame 710 transmitted by the beamformer 700, in particular, the beamformee 1 760 receiving the beamforming frame as the response of the NDP frame 710 does not configure the beamforming frame including the channel information of the beamformee 1 760 within a predetermined time section, for example, an SIFS section 720, the beamformee 1 750 transmits the null feedback frame 765 to the beamformer 700 according to the NDPA frame 705.

Here, in the beamformees 760 and 780 receiving the NDPA frame 705 and the NDP frame 710, the beamformee 1 760 having the response priority to the NDP frame 710 extracts the channel information included in the beamforming report field of the beamforming frame within the SIFS section 720 to configure the beamforming frame including the channel information. However, the channel information included in the beamforming report field of the beamforming frame increase the amount of data as a width of a channel for the beamformee 1 760, that is, a bandwidth of a channel is large or the number of antennas used to transmit/receive data is increased Therefore, the beamformee 1 760 does not generate the beamforming frame including the large-capacity channel information extraction and the large-capacity channel information within the SIFS section 720, as described above. Therefore, the beamformee 1 760 transmits the null feedback frame 765 to the beamformer 700.

Further, as described above, as the beamformee 1 760 receives the NDP frame 710 but does not configure the beamforming frame including its own channel information within the SIFS section 720, the null feedback frame 765 does not include the beamforming report field of the beamforming frame and becomes the beamforming frame including only the control information field of the beamforming frame. That is, the null feedback frame 765 does not include the channel information of the beamformee 1 760 and is transmitted to the beamformer 700 as a frame including only the control information field of the beamforming frame. In addition, the control information field included in the null feedback frame 765 includes the information on whether the NDP frame 710 is normally received in the beamformee 1 760. Here, the information on whether the NDP frame is normally received is included in the NDP mission field of the control information field and the beamforming frame, that is, the null feedback frame 765 including the information on whether the NDP frame 710 is normally received will be described in more detail with reference to FIG. 6 and therefore, the detailed description thereof will be omitted. In addition, the null feedback frame 765 is transmitted to the beamformer 700 after the SIFS section 720, after the NDP frame 710 is transmitted to the beamformer 1 760.

As such, the beamformer 700 receiving the null feedback frame 765 from the beamformee 1 760 transmits the beamforming-poll frame 1 725 to the beamformee 1 760 so that the beamformee 1 760 transmits the beamforming frame including the channel information of the beamformee 1 760, thereby acquiring the channel information of the beamformee 760. In this case, the beamformer 700 transmits the beamforming-poll frame 1 725 to the beamformee 1 760 transmitting the null feedback frame 765 so that the beamformee 1 760 configures and transmits the beamforming frame including its own channel information, since the beamformee 1 760 does not normally receive the NDP frame 710 but does not configure the beamforming frame including its own channel information within the SIFS section 720 and thus, does not acquire the channel information of the beamformee 1 760.

In this case, the beamforming-poll frame 1 725 is transmitted to the beamformee 1 760 after the SIFS section 730, after receiving the null feedback frame 765 from the beamformee 1 760. In addition, as described above, the beamforming-poll frame 1 725 is transmitted for the sounding of the beamformees that do not transmit the beamforming frame or is transmitted for the retransmission of the beamforming frame for the beamformees when using the sounding protocol for acquiring the channel information of the plurality of beamformees. Here, when the beamformee transmitting the current beamforming frame is set as a receiving address, the beamforming-poll frame 1 725 is transmitted to the corresponding beamformee.

Further, the beamformee 1 760 receiving the beamforming-poll frame 1 725 configures the beamforming frame 1 770 including the channel information of the beamformee 1 760 and then, transmits the beamforming frame 1 770 to the beamformer 700. Here, the beamformee 1 760 extracts its own channel information using the NDP frame 710 and configures the beamforming frame 1 770 including the extracted channel information and transmits the configured beamforming frame 1 770 to the beamformer 700, as it acquires a sufficient time required to configure the beamforming frame 1 770 including its own channel information from the reception of the NDP frame 710 to the reception of the beamforming-poll frame 1 725. Further, the beamforming frame 1 770 is transmitted to the beamformer 700 after an SIFS section 735, after the beamforming-poll frame 1 725 is transmitted to the beamformee 1 760, that is, the beamformee 1 760 receives the beamforming-poll frame 1 725.

As such, the beamformer 700 receiving the null feedback frame 1 770 from the beamformee 1 760 transmits the beamforming-poll frame 2 740 to the beamformee 2 780 so that the beamformee 2 780 transmits the beamforming frame including the channel information of the beamformee 2 780, thereby acquiring the channel information of the beamformee 2 780. Here, the beamformer 700 transmits the beamforming-poll frame 2 740 to the beamformee 2 780 so that the remaining beamformee, for example, the beamformee 2 780 transmits the beamforming frame including the channel information, that is, acquires the channel information of the beamformee 2 780.

In this case, the beamforming-poll frame 2 740 is transmitted to the beamformee 2 780 after the SIFS section 745, after receiving the beamforming frame 1 770 from the beamformee 1 760. In addition, as described above, the beamforming-poll frame 2 740 is transmitted for the sounding of the beamformees that do not transmit the beamforming frame or is transmitted for the retransmission of the beamforming frame for the beamformees, when using the sounding protocol so as to acquire the channel information of the plurality of beamformees. Here, when the beamformee transmitting the current beamforming frame is set as a receiving address, the beamforming-poll frame 2 740 is transmitted to the corresponding beamformee.

Further, the beamformee 2 780 receiving the beamforming-poll frame 2 740 configures the beamforming frame 2 785 including the channel information of the beamformee 2 780 and then, transmits the beamforming frame 2 785 to the beamformer 700. Here, the beamformee 2 780 extracts its own channel information using the NDP frame 710 and configures the beamforming frame 2 785 including the extracted channel information and transmits the configured beamforming frame 2 785 to the beamformer 700, as it acquires a sufficient time required to configure the beamforming frame 2 785 including its own channel information from the reception of the NDP frame 710 to the reception of the beamforming-poll frame 2 740. Further, the beamforming frame 2 785 is transmitted to the beamformer 700 after an SIFS section 750, after the beamforming-poll frame 2 740 is transmitted to the beamformee 2 780, that is, the beamformee 2 780 receives the beamforming-poll frame 2 740.

Here, for convenience of explanation, in FIG. 7, the NDP frame 710 is normally received but the beamforming frame including the channel information within the SIFS section 720 is not configured to first transmit the beamforming-poll frame to the beamformee 1 760 transmitting the null feedback frame 765 and thus, the case in which the normal beamforming frame including the channel information of the beamformee 1 760 is received from the beamformee 1 760 transmitting the null feedback frame 765 is mainly described. However, the embodiment of the present invention receives the beamforming frame including the channel information from the remaining beamformees other than the beamformee 1 760 transmitting the null feedback frame 765, for example, the beamformee 2 780 and then, transmits the beamforming-poll frame to the beamformee 1 760 transmitting the null feedback frame 765 to receive the normal beamforming frame including the channel information of the beamformee 1 760 from the beamformee 1 760 transmitting the null feedback frame 765.

As such, the beamformer 700 receiving the beamforming frames 770 and 785 from the beamformees 760 and 780 acquires the channel information of the beamformees 760 and 780, respectively, from the beamforming frames 770 and 785 and then, in order to transmit and receive data to and from the beamformees 770 and 780 through the beamforming according to the MIMO scheme, generates the steering matrix necessary for the beamforming by using the channel information, and then, transmits and receives data to and from the beamformees 770 and 780 through the beamforming according to the MIMO scheme. Here, the beamformer 700 generates the steering matrix for beamforming for the beamformees 770 and 780, respectively, according to the MIMO scheme or generates the steering matrix for simultaneously beamforming for the beamformees 770 and 780 according to the multi user MIMO scheme. Here, the apparatus (i.e., the beamformer) for transmitting data through the beamforming according to the MIMO scheme in the communication system in accordance with the embodiments of the present invention will be described in detail with reference to FIG. 8.

Figure 8:
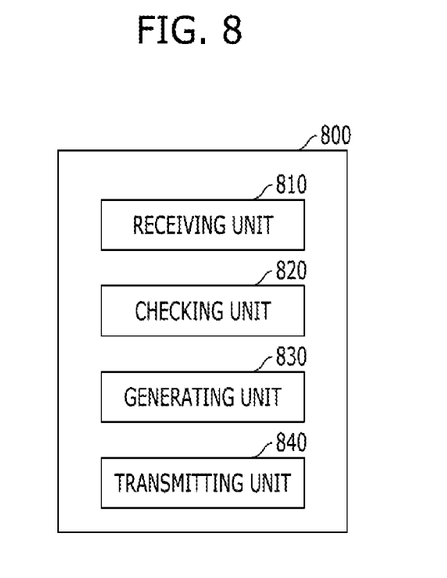
FIG. 8 is a diagram schematically illustrating a structure of an apparatus for transmitting data in a communication system in accordance with an embodiment of the present invention.

FIG. 8 is a diagram schematically illustrating a structure of an apparatus for transmitting data in the communication system in accordance with the embodiment of the present invention. Here, as described above, FIG. 8 is a diagram schematically illustrating a structure of the apparatus (i.e., beamformer) for transmitting data to the apparatus (i.e., beamformee) for receiving data through the beamforming according to the MIMO scheme.

As described above, referring to FIG. 8, the apparatus for transmitting data acquires the channel information of the beamformee for transmitting/receiving data to and from the apparatus for receiving data through the beamforming according to the MIMO scheme, that is, the beamformee. Further, the apparatus for transmitting data includes a transmitting unit 840 transmitting the NDPA frame and the NDP frame to the beamformee for acquiring the channel information of the beamformee, a receiving unit 810 receiving the beamforming frame including the channel information of the beamformee from the beamformee receiving the NDPA frame and the NDP frame, a checking unit 820 acquiring and checking the channel information of the beamformee from the beamforming frame, and a generating unit 830 generating the steering matrix by using the channel information of the beamformee.

Here, the receiving unit 810 receives the null feedback frame from the beamformee that does not configure the beamforming frame including the channel information within the predetermined time section, for example, the SIFS section after the NDP frame is not normally received or the NDP frame is received. The checking unit 820 checks the null feedback frame, in more detail, the information indicating whether the NDP frame included in the NDP missing filed of the control information field of the beamforming frame is normally received as described in FIG. 6. In addition, the transmitting unit 840 again transmits the NDPA frame and the NDP frame for resounding to the beamformee that does not normally receive the NDP frame according to the information indicating whether the NDP frame included in the NDP missing field is normally received.

Further, the generating unit 830 generates the beamforming-poll frame using the beamformee that does not configure the beamforming frame including the channel information within the SIFS section as the receiving address according to the information indicating whether the NDP frame included in the NDP missing field is normally received and the transmitting unit 840 transmits the beamforming-poll frame to the beamformee that does not configure the beamforming frame. In the beamformee, the detailed operation between the beamformer and the beamformee and the null feedback frame according to whether the NDP frame is normally received and whether the beamforming frame including the channel information within the SIFS section is configured will be already described in detail and therefore, the detailed description thereof will be omitted. Here, the apparatus (i.e., beamformee) for receiving data through the beamforming according to the MIMO scheme in the communication system in accordance with the embodiments of the present invention will be described in detail with reference to FIG. 9.

Figure 9:
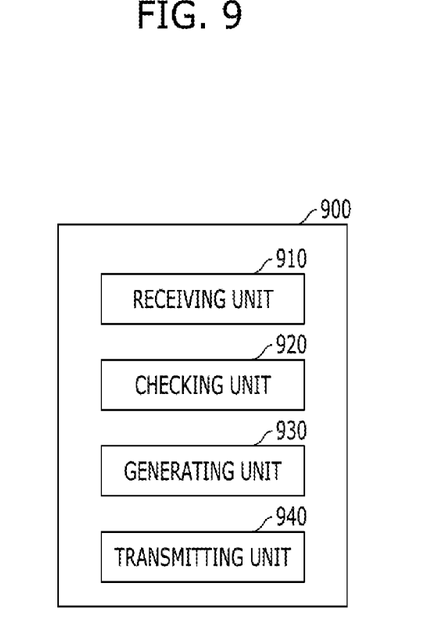
FIG. 9 is a diagram schematically illustrating a structure of an apparatus for receiving data in a communication system in accordance with an embodiment of the present invention.

FIG. 9 is a diagram schematically illustrating the structure of the apparatus for receiving data in the communication system in accordance with the embodiment of the present invention. As described above, FIG. 9 is a diagram schematically illustrating the apparatus for receiving data from the apparatus (i.e., beamformer) for transmitting data through the beamforming according to the MIMO scheme, that is, the structure of the beamformee.

As described above, referring to FIG. 9, the apparatus for receiving data provides the channel information of the beamformee to the beamformer for transmitting/receiving data to and from the apparatus (i.e., beamformer) for transmitting data through the beamforming according to the MIMO scheme. Further, the apparatus for receiving data includes a receiving unit 910 receiving the NDPA frame and the NDP frame from the beamformer acquiring the channel information of the beamformee, a checking unit 920 extracting and checking the channel information of the beamformee by using the NDP frame, a generating unit 930 generating the beamforming frame including the channel information of the beamformee, and a transmitting unit 940 transmitting the beamforming frame including the channel information of the beamformee to the beamformer.

The checking unit 920 checks whether the NDP frame is normally received in the receiving unit 910 and whether the beamforming frame including the channel information are configured within the predetermined time section, for example, the SIFS section after the NDP frame is received. Further, the generating unit 930 generates the beamforming frame, that is, the null feedback frame including only the control information field including the information indicating whether the NDP frame is normally received and the transmitting unit 940 transmits the null feedback frame to the beamformer. In addition, the receiving unit 910 receives the beamforming-poll frame from the beamformer, corresponding to the null feedback frame and the transmitting unit 940 transmits the beamforming frame including the channel information of the beamformee to the beamformer according to the beamforming-poll frame. In the beamformee, the detailed operation between the beamformer and the beamformee and the null feedback frame according to whether the NDP frame is normally received and whether the beamforming frame including the channel information within the SIFS section is configured will be already described in detail and therefore, the detailed description thereof will be omitted. Here, the operation of transmitting data through the beamforming according to the MIMO scheme in the communication system in accordance with the embodiments of the present invention will be described in detail with reference to FIG. 10.

Figure 10:
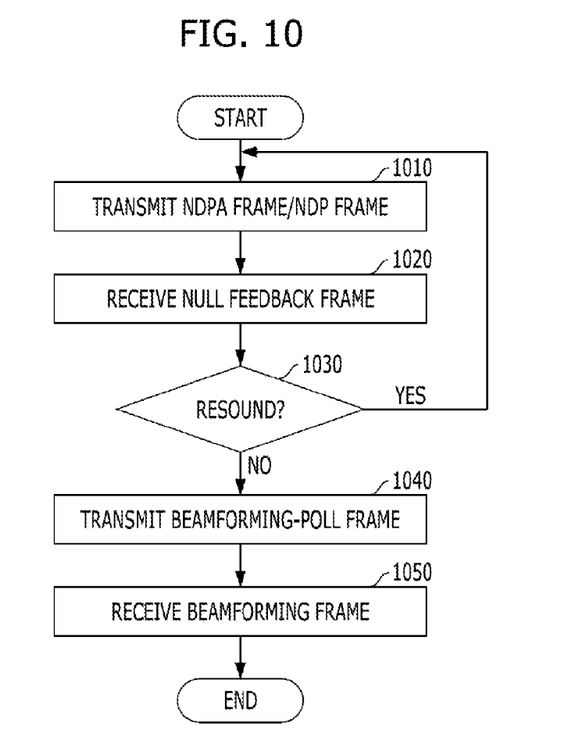
FIG. 10 is a diagram schematically illustrating an operation process of an apparatus for transmitting data in a communication system in accordance with an embodiment of the present invention.

FIG. 10 is a diagram schematically illustrating an operation process of the apparatus for transmitting data in a communication system in accordance with the embodiment of the present invention. As described above, FIG. 10 is a diagram schematically illustrating the operation process of the apparatus (i.e., beamformer) for transmitting data to the apparatus for receiving data through the beamforming according to the MIMO scheme, that is, the beamformee.

Referring to FIG. 10, in S1010, the apparatus for transmitting data transmits the NDPA frame and the NDP frame to the beamformee so as to acquire the channel information of the beamformee for transmitting/receiving data to and from the apparatus (i.e., beamformee) for receiving data through the beamforming according to the MIMO scheme, as described above.

Further, in S1020, the null feedback frame is received from the beamformee that does not normally receive the NDP frame or does not configure the beamforming frame including the channel information within the predetermined time section, for example, the SIFS section after the receiving the NDP frame. Here, in S1050, the beamforming frame including the channel information of the beamformee is received from the beamformee configuring the beamforming frame normally receiving the NDP frame and including the channel information within the SIFS section. In FIG. 10, for convenience of explanation, the case in which the null feedback frame is received from the beamformee that does not normally receive the NDP frame or does not configure the beamforming frame including the channel information within the SIFS section will be mainly described.

Next, in S1030, it is checked whether the resounding with the beamformee is performed according to whether the NDP frame in normally received, by checking the null feedback frame, in more detail, the information indicating whether the NDP frame included in the NDP missing filed of the control information field of the beamforming frame is normally received as described in FIG. 6. That is, as the checking result in S1030, for the resounding with the beamformee that does not normally receive the NDP frame, in 51010, the NDPA frame and the NDP frame are transmitted to the beamformee that does not normally receive the NDP frame.

Further, as the checking result in S1030, the beamforming-poll frame for retransmission of the beamforming frame including the channel information is transmitted to the beamformee in S1040 so as to receive the beamforming frame including the channel information from the beamformee that does not the beamforming frame including the channel information within the SIFS section after normally receiving the NDP frame.

Next, in S1050, the beamforming frame including the channel information of the beamformee is received from the beamformee receiving the beamforming-poll frame, the steering matrix is generated using the channel information included in the beamforming frame, and then, data are transmitted/received through the beamformee and the beamforming. In the beamformee, the detailed operation between the beamformer and the beamformee and the null feedback frame according to whether the NDP frame is normally received and whether the beamforming frame including the channel information within the SIFS section is configured will be already described in detail and therefore, the detailed description thereof will be omitted. Here, the operation of receiving data through the beamforming according to the MIMO scheme in the communication system in accordance with the embodiments of the present invention will be described in detail with reference to FIG. 11.

Figure 11:
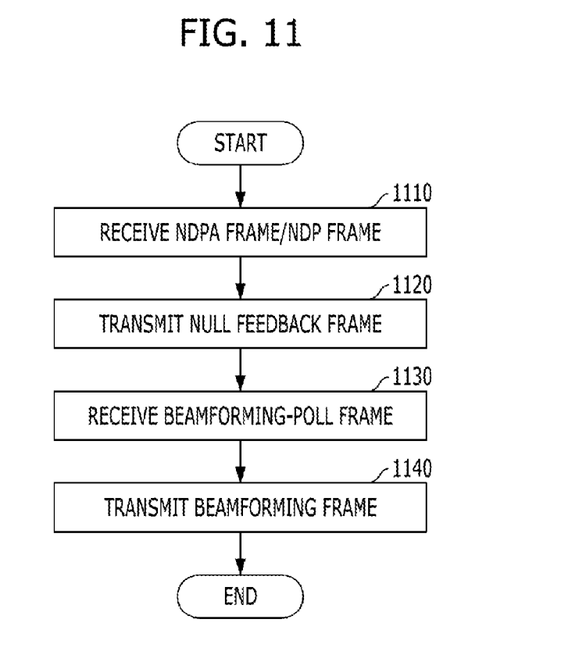
FIG. 11 is a diagram schematically illustrating an operation process of an apparatus for receiving data in a communication system in accordance with an embodiment of the present invention.

FIG. 11 is a diagram schematically illustrating an operation process of the apparatus for receiving data in the communication system in accordance with the embodiment of the present invention. As described above, FIG. 11 is a diagram schematically illustrating the operation process of the apparatus (i.e., beamformee) for receiving data from the apparatus (i.e., beamformer) for transmitting data through the beamforming according to the MIMO scheme.

Referring to FIG. 11, in S1110, the receiving apparatus receives the NDPA frame and the NDP frame from the beamformer so as to provide the channel information of the beamformee to the beamformer for transmitting/receiving data to and from the apparatus (i.e., beamformer) for transmitting data through the beamforming according to the MIMO scheme.

Further, in S1120, when the NDP frame is not normally received or the beamforming frame including the channel information is not configured within the predetermined time section, for example, the SIFS section after the NDP frame is received, the null feedback frame is transmitted to the beamformer. Here, when the NDP frame is normally received and the beamforming frame including the channel information is configured within the SIFS section, like 51140, the beamforming frame including the channel information of the beamformee is transmitted to the beamformer. In FIG. 11, for convenience of explanation, when the NDP frame is not normally received or the beamforming frame including the channel information is not configured within the SIFS section, the case in which the beamformee transmits the null feedback frame will be mainly described.

Next, in S1130, the beamforming-poll frame for transmitting the beamforming frame including the channel information is received from the beamformer according to the transmission of the null feedback frame. Further, in S1140, after the channel information of the beamformee is extracted by using the received NDP frame, the beamforming frame including the channel information of the beamformee is generated and is transmitted to the beamformer. In the beamformee, the detailed operation between the beamformer and the beamformee and the null feedback frame according to whether the NDP frame is normally received and whether the beamforming frame including the channel information within the SIFS section is configured will be already described in detail and therefore, the detailed description thereof will be omitted.

As described above, in the communication system in accordance with the embodiment of the present invention, for acquiring the channel information of the beamformee so as to transmit and receive data between the beamformer and the beamformee through the beamforming according to the MIMO scheme, the NDPA frame and the NDP frame are transmitted and received between the beamformer and the beamformee and then, the beamforming frame including the channel information of the beamformee extracted by using the NDP frame is transmitted and received. In this case, when the channel information of the beamformee is not included in the beamforming frame, the beamforming frame including the information indicating whether the NDP frame is normally received in the control information field of the beamforming frame, that is, the null feedback frame is transmitted/received. Therefore, after the NDP frame is not received in the beamformee or the NDP frame is normally received in the beamformee through the information indicating whether the NDP frame is normally received in the control information field of the beamforming frame, the non-configuration of the beamforming frame including the channel information of the beamformee is checked. As the checking result, the NDPA frame and the NDP frame are again transmitted/received between the beamformer and the beamformee or the beamforming-poll frame is transmitted and received to transmit and receive the beamforming frame including the channel information of the beamformee.

The exemplary embodiments of the present invention can rapidly and normally the channel information of the terminal for transmitting/receiving data through the beamforming according to the MIMO scheme by transmitting/receiving the information indicating whether the data packet frame is normally received in the communication system and whether the beamforming frame including the channel information is configured. Therefore, the exemplary embodiments of the present invention can rapidly and stably transmit/receive the large-capacity data through the beamforming according to the MIMO scheme by using the channel information of the terminal.

While the present invention has been described with respect to the specific embodiments, it will be apparent to those skilled in the art that various changes and modifications may be made without departing from the spirit and scope of the invention. Accordingly, the scope of the invention is not limited to exemplary embodiments as described above and is defined by the following claims and equivalents to the scope the claims.

What is claimed is:

1. An apparatus for transmitting data in a communication system, comprising:
   a transmitting unit configured to transmit a null data packet announcement (NDPA) frame and a null data packet (NDP) frame to a terminal so as to acquire channel information of the terminal for transmitting and receiving data through beamforming according to multi-input multi-output (MIMO);
   a receiving unit configured to receive a beamforming frame from the terminal as a response of the null data packet announcement frame and the null data packet frame; and
   a checking unit configured to check indication information on whether the null data packet frame included in the a control information field of the beamforming frame is normally received,
   wherein the transmitting unit retransmits the data packet announcement frame and the null data packet frame to the terminal or transmit a beamforming-poll frame to the terminal according to the indication information on whether the null data packet frame is normally received.

2. The apparatus of claim 1, wherein the information on whether the null data packet frame is normally received is included in a null data packet missing field in the control information field of the beamforming frame.

3. The apparatus of claim 1, wherein the receiving unit receives the beamforming frame including only the control information field including the indication information on whether the null data packet frame is normally received from the terminal as a null feedback frame.

4. The apparatus of claim 1, wherein the receiving unit receives the beamforming frame including the channel information of the terminal from the terminal according to retransmission of the null data packet announcement frame and the null data packet frame or transmission of the beamforming-poll frame.

5. The apparatus of claim 1, wherein the checking unit checks that the null data packet frame is not received in the terminal through the indication information on whether the null data packet frame is normally received, and the transmitting unit retransmits the null data packet announcement frame and the null data packet frame to the terminal when the null data packet frame is not received.

6. The apparatus of claim 1, wherein the checking unit checks a non-configuration of the beamforming frame including the channel information of the terminal within a short interframe space (SIFS) section after the null data packet frame is normally received in the terminal, by indication information on whether the null data packet frame is normally received.

7. The apparatus of claim 6, wherein the transmitting unit transmits the beamforming-poll frame to the terminal according to the non-configuration of the beamforming frame including the channel information of the terminal.

8. An apparatus for receiving data in a communication system, comprising;

a receiving unit configured to receive a null data packet announcement (NDPA) frame and a null data packet (NDP) frame from a transmitter so as to provide channel information of the terminal for transmitting and receiving data through beamforming according to multi-input multi-output (MIMO);

a transmitting unit configured to transmit a beamforming frame to the transmitter as a response of the null data packet announcement frame and the null data packet frame; and a checking unit configured to extract channel information of the terminal by using the null data packet frame, wherein the transmitting unit transmits a beamforming frame including indication information on whether the null data packet frame is normally received or transmits beamforming frame including the channel information of the terminal to the transmitter.

9. The apparatus of claim 8, wherein the indication information on whether the null data packet frame is normally received is included in a null data packet missing field in the control information field of the beamforming frame.

10. The apparatus of claim 8, wherein the transmitting unit transmits the beamforming frame including only the control information field including the indication information on whether the null data packet frame is normally received to the transmitter as a null feedback frame.

11. The apparatus of claim 8, wherein the transmitting unit transmits the beamforming frame including indication information on whether the null data packet frame is not received to the transmitter, and the receiving unit re-receives the null data packet announcement frame and the null data packet frame from the transmitter when the null data packet frame is not received.

12. The apparatus of claim 11, wherein the transmitting unit transmits a beamforming frame including the channel information of the terminal extracted through the re-received null data packet frame to the transmitter.

13. The apparatus of claim 1, wherein the transmitting unit transmits the beamforming frame including the indication information on a non-configuration of the beamforming frame including the channel information of the terminal to the transmitter within a short interframe space (SIFS) section after the null data packet frame is normally received.

14. The apparatus of claim 13, wherein the receiving unit receives a beamforming-poll frame from the terminal according to the non-configuration of the beamforming frame including the channel information of the terminal.

15. The apparatus of claim 14, wherein the transmitting unit transmits the beamforming frame including the channel information of the terminal extracted through the null data packet frame according to the beamforming-poll frame to the transmitter.

16. A method for transmitting/receiving data in a communication system, comprising:

transmitting a null data packet announcement (NDPA) frame and a null data packet (NDP) frame to a terminal so as to acquire channel information of the terminal for transmitting and receiving data through beamforming according to multi-input multi-output (MIMO);

receiving a beamforming frame from the terminal as a response of the null data packet announcement frame and the null data packet frame; and checking channel information of the terminal included in the beamforming frame and indication information on whether the null data packet frame included in the a control information field of the beamforming frame is normally received.

17. The method of claim 16, wherein the indication information on whether the null data packet frame is normally received is included in a null data packet missing field in the control information field of the beamforming frame.

18. The method of claim 16, wherein the receiving receives the beamforming frame including only the control information field including the indication information on whether the null data packet frame is normally received from the terminal as a null feedback frame.

19. The method of claim 16, further comprising:

retransmitting the null data packet announcement frame and the null data packet frame to the terminal when the null data packet frame is not received, in the checking, a non-receive of the null data packet frame is checked in the terminal through the indication information on whether the null data packet frame is normally received.

20. The method of claim 16, further comprising:

transmitting the beamforming-poll frame to the terminal according to the non-configuration of the beamforming frame including the channel information of the terminal, in the checking, a non-configuration of the beamforming frame including the channel information of the terminal is checked within a short interframe space (SIFS) section after the null data packet frame is normally received in the terminal, by indication information on whether the null data packet frame is normally received.

* * * * *